United States Patent [19]

Herget et al.

[11] Patent Number: 5,228,912
[45] Date of Patent: Jul. 20, 1993

[54] SURFACE-MODIFIED, PLATELET-SHAPED PIGMENTS HAVING IMPROVED DISPERSIBILITY

[75] Inventors: Gerhard Herget, Ober Ramstadt; Tanja Delp, Darmstadt, both of Fed. Rep. of Germany

[73] Assignee: Merck Patent Gesellschaft Mit Beschrankter Haftung, Darmstadt, Fed. Rep. of Germany

[21] Appl. No.: 888,709

[22] Filed: May 27, 1992

[30] Foreign Application Priority Data

May 28, 1991 [DE] Fed. Rep. of Germany ....... 4117502

[51] Int. Cl.$^5$ .................................................. C09C 3/10
[52] U.S. Cl. .................................... 106/505; 106/479; 106/417
[58] Field of Search ............... 106/415, 505, 417, 416, 106/479

[56] References Cited

U.S. PATENT DOCUMENTS 3,832,208  8/1974  Jackson ............................... 106/505

FOREIGN PATENT DOCUMENTS 61-286310  12/1986  Japan .

Primary Examiner—Karl Group
Assistant Examiner—Chris Gallo
Attorney, Agent, or Firm—Millen, White, Zelano & Branigan

[57] ABSTRACT

The present invention relates to surface-modified pigments based on platelet-shaped substrates having improved dispersibility and to their preparation and use.

14 Claims, No Drawings

SURFACE-MODIFIED, PLATELET-SHAPED PIGMENTS HAVING IMPROVED DISPERSIBILITY

BACKGROUND OF THE INVENTION

The present invention relates to surface-modified "plate-like", e.g., platelet-shaped, pigments having improved dispersibility and to their preparation and use.

The handling of paints, printing inks, and the like containing platelet-shaped pigments is problematic inasmuch as the pigments easily settle, due to their size and density compared with the paint medium, and can then agglomerate give a very solid sediment cake. In practice, this usually cannot be prevented, unless the printing inks are kept in constant agitation, for example, by stirring or recirculation.

Thus, inter alia, many methods have been developed in order to solve the problem of handling platelet-shaped pigments in paints and printing inks.

Redispersion can be facilitated by adding to the coating compositions, such as paints, varnishes, printing inks, and the like, additives which either result in selective flocculation (a "house-of-cards" effect), structurally viscous and/or thixotropic behavior, steric repulsion and/or electrostatic repulsion of the pigments.

The addition of thickeners (thixotropic reagents), which in the usual cases prevent sedimentation by increasing the viscosity of the paint medium (EP-0,198,519; DE-OS 1,805,693), can be used in the case of printing inks only to a limited extent, since, if the ink is to be printed, a certain narrow viscosity range must be maintained.

The production of structural viscosity on the pigment surface by the addition of finely divided silica gels or bentonites is also only of limited use, since the gloss of the pigment coating may suffer; and, on the other hand, structural viscosity in printing inks is usually undesirable.

Furthermore, all these additives can have an adverse effect on the quality of the coating. In particular the brilliance of nacreous pigments and the uniformity of the coating may be impaired. In general, the higher the concentration of the additives used, the greater the impairment.

SUMMARY OF THE INVENTION

An object was therefore to find platelet-shaped pigments which upon incorporation in a paint or printing ink do not or only to a small extent show the disadvantages observed with conventional pigmented coating compositions. Furthermore, the pigments should be widely compatible with a wide range of binder systems.

Surprisingly, it has now been found that platelet-shaped pigments which are coated with a polyacrylate or polymethacrylate or salts thereof and, if desired, a solvent or solvent mixture have substantially improved redispersion behavior without any adverse effect on the other properties, such as gloss and printing behavior. The surface-modified pigments according to the invention do not dust and are present as free-flowing materials. Furthermore, the pigments are widely compatible with aqueous and also with solvent-containing printing ink systems.

Accordingly, the invention relates to surface-modified, platelet-shaped pigments which are coated with a modifying reagent comprising a polyacrylate or polymethacrylate and water-soluble salts thereof in order to improve redispersibility.

The coating of pigments using acrylates is known; for example, in DE 2,215,191 (corresponding to U.S. Pat. No 3,832,208), $TiO_2$-coated mica sheets are treated with methacrylate/chromium trichloride. In JP-A2 61/286,310, pigments for the preparation of cosmetics are described, which are coated with a mixture comprising calcium alginate, calcium polyacrylate and magnesium polyacrylate. The coating of platelet-shaped substrates with polyacrylates or polymethacrylates or water-soluble salts thereof with or without a solvent or solvent mixture has hitherto not been disclosed.

Accordingly, the invention also relates to a process for the preparation of surface-modified, platelet-shaped pigments, characterized in that platelet-shaped pigments are coated in a mixing vessel with a polyacrylate or polymethacrylate or water-soluble salts thereof with or without a solvent or solvent mixture with stirring.

All known platelet-shaped metals, metal oxides, mica pigments and other platelet-shaped substrates can be coated by the process according to the invention. Examples of these are mica, talc, kaolin or other comparable minerals and platelet-shaped iron oxide and bismuth oxychloride.

Preferred platelet-shaped substrates are talc, kaolin, metal oxide coated and other platelet-shaped minerals, or synthetic inorganic materials with a platelet-shape. Especially preferred substrates are mica and metal oxide coated mica.

A preferred particle size range of the platelet-shaped substrate is 1–100$\mu$m, especially preferred is 5–60 $\mu$m. The thickness of the platelet-shaped particles is 0.02–1 $\mu$m: especially preferred is 0.05–0.5 $\mu$m.

Since no high shearing forces are required in the process, the process is also highly suitable for the coating of nacreous pigments. Any customary nacreous pigments can be used, for example, coatings of mica with colored or colorless metal oxides, such as $TiO_2$, $Fe_2O_3$, $SnO_2$, $Cr_2O_3$, $ZnO$ and other metal oxides, alone or in a mixture, in a uniform layer or in successive layers. These pigments are known, for example, from German Patents and Patent Applications 1,467,468; 1,959,998; 2,009,566; 2,214,545; 2,215,191; 2,244,298; 2,313,331; 2,522,572; 3,137,808; 3,137,809; 3,151,343; 3,151,354; 3,151,355; 3,211,602 and 3,235,017 and are commercially available, for example, under the tradename Iriodin ® from E. Merck, Darmstadt.

Components of the modifying reagent are polyacrylates or polymethacrylates or water-soluble salts thereof, in particular those containing sodium cations, potassium cations, ammonium cations or organic ammonium compounds. The molecular weights are between 100 and 100,000, preferably between 400 and 50,000, in particular between 800 and 20,000. Preferred cations are water-soluble salts of polyacrylates, preferably sodium salts. Preferred organic ammonium compounds are monoethanol ammonium salt, dimethylaminoethanol salt, aminoethylpropanol salt, morpholine salt and triethanolammonium salt. Substitution in the polyacrylates and polymethacrylates may be of any moiety which does not detrimentally affect its properties in combination with the pigment or substrate. Certain substitutions will increase affinity of the acrylates for the substrate or otherwise desirably affect the properties of the product, as is known to or readily determinable by one of ordinary skill in the art. The polyacrylates or polymethacrylates can contain various groups with pigment affinity, such as, for example, amino, hydroxyl, carbonyl, carboxyl, alkoxycarbonyl, sulfonyl, sulfonylmethyl, ether, phenyl, phenoxy, phosphate and amido functions, and are applied to the pigment in an amount of about 0.1 to 20% by weight, in particular 0.2 to 10% by weight. A preferred group with pigment affinity is a tertiary amine group. There are pigment affinity groups incorporated in the polymeric chain in such an amount that the pigment affinity is optimum. The number of substituents per polymer unit depends on the pigment type to be coated. Therefore, the number of substitutions on the polymer varies within a broad range but is easily and routinely determinable by one of ordinary skill in the art.

The process according to the invention is simple and easy to handle. The various polyacrylates or polymetha-crylates or salts thereof are prepared by methods known per se, such as are described in the literature (for example, W.R. Sorenson, T.W. Campbell, Preparative Methoden der Polymerchemie (Preparative Methods of Polymer Chemistry), Verlag Chemie, Weinhein 1962; J.A. Moore, Macromolecular Syntheses, Coll. Vol. 1, Wiley & Sons, N.Y., 1978; J. Ulbricht, Grundlagen der Synthese von Polymeren (Principles of Polymer Synthesis), Akademie Verlag, Berlin 1978) and under reaction conditions known and suitable for the reactions mentioned. These reactions can also be carried out using variants known per se but not mentioned in the literature and can be copolymerized with other ethylenically unsaturated monomers. Examples of suitable comonomers are acrylic and methacrylic esters, dicarboxylic acids, such as fumaric acid or maleic acid, monoesters or diesters of the dicarboxylic acids mentioned, acrylonitrile, methacrylonitrile, acrylamide and methacrylamide. The modifying reagent can additionally contain a solvent or solvent mixture. The modifying reagent is then prepared by mixing the polymer with a solvent or solvent mixture. Depending on the type of modifying reagent used, suitable solvents are water and any organic solvents, for example, esters, acetates, alcohols, such as ethanol, propanol, isopropanol, 1-methoxy-2-propanol, tert.-butanol, and aromatic solvents, for example, benzene, xylene, and toluene. Preferred solvents are alcohols and acetates. Especially preferred is methoxypropanol.

Additionally, the modifying reagent may also contain a plasticizer. Suitable for this purpose are, in particular, plasticizers which are liquid at room temperature, since these may, if desired, replace the solvent in the modifying reagent. All customary plasticizers can be used, for example, phthalates, adipates and polymer plasticizers, in amounts of 1 to 100% by weight, preferably 1 to 70% by weight, in particular 3 to 20% by weight, based on the modifying reagent. Examples of plasticizers used are phthalic esters with linear, branched or cyclic alcohols with 1 to 12 carbon atoms, esters of adipic, sebacic or azelic acid; fatty esters; epoxidated fatty acids; citric esters and also plasticizers based on phosphoric acid. Preferred plasticizers are compatible with the acrylic reagent and preferably in the liquid state at room temperature. Such plasticizers have the highest ability to reduce dust of the total preparation. Furthermore, the plasticizers are characterized in that they have a broad compatibility with the usual components of gravure inks and with binders and solvents as well as additives. Preferred plasticizers are based on phthalic acid, more preferred are dialkyl phthalates.

The polymer concentration in the solvent is usually 5 to 80% by weight, preferably 10 to 50% by weight.

The preparation of the pigments according to the invention can be described as follows: The starting pigments mentioned are initially introduced into a mixing vessel, for example, a tumbler, impeller mixer, blade or fluid mixer; and the modifying reagent is added with stirring. If desired, the solvent can then be removed. However, it can also remain there if a non-dusting preparation is desired.

The pigments according to the invention are compatible with a large number of paint systems, preferably from the area of varnishes, paints and printing inks.

Accordingly, the invention also relates to the use of the coated pigments in formulations such as varnishes, printing inks, paints and for the preparation of cosmetics.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above and below, and of corresponding German Application P 41 17 502.6, filed May 28, 1991, are hereby incorporated by reference.

EXAMPLES

I. Preparation of the Modifying Reagent

Experiment 1a 340 g of acrylic acid in 226 g of fully deionized water are reacted in a 1 liter round-bottom flask with 35 g of hydrogen peroxide (30% by weight) in 30 g of fully deionized water and 28 g of thioglycolic acid (80% by weight) in 30 g of fully deionized water over a period of 6 h at the reflux temperature. After complete addition of the components, the mixture is heated for another hour with stirring and then allowed to cool. The solid is filtered off, and the filter material is dissolved in a mixture of butyl acetate/2-butanol (5:1). The solution is brought to 25% by weight with 1-methoxy-2-propanol.

Experiment 1b

Analogously to Experiment 1a, 340 g of acrylic acid are reacted to an aqueous polyacrylate suspension. By adding sodium hydroxide solution (30% by weight), the polymer is completely neutralized and becomes water-soluble. A clear solution is obtained which is brought to 13% by weight with fully deionized water.

II. Pigment Preparation

EXAMPLE 1

Pigment Preparation Using Polyacrylate 95 g of Iriodin ® 300 Goldperl (mica flake pigment coated with titanium dioxide and iron oxide from E. Merck, Darmstadt, having a particle size of 10–60 μm) are initially introduced. 10 g of a 25% strength by weight solution of the polyacrylate from Experiment 1a in 1-methoxy-2-propanol : butylacetate 2-butanol (5 : 2.1 : 0.4) are added dropwise over a period of 15 minutes with stirring using an impeller mixer. This gives a homogeneously divided, non-dusting preparation.

EXAMPLE 2

Pigment Preparation Using Sodium Polyacrylate 96 g of Iriodin ® 123 Bright Lustre Satin (mica flake pigment coated with titanium dioxide from E. Merck, Darmstadt, having a particle size of 5-20 μm) are initially introduced. 10 g of a 13% strength by weight solution of the sodium polyacrylate from Experiment 1b in water are added dropwise to the pigment with stirring using an impeller mixer. After 15 minutes, the moist pigment is removed and used in this non-dusting form for the experiments described under III.

EXAMPLE 3

10 parts of a 25% by weight solution of polyacrylate of Experiment 1a are mixed with 10 parts of dioctyl phthalate and added dropwise with stirring to 80 parts of Iriodin ® 123 Bright Lustre Satin. This produces a homogeneously divided, non-dusting preparation.

EXAMPLE 4

Analogously to Example 3, 5 parts of a 25% by weight solution of the polyacrylate of Experiment 1a are mixed with 5 parts of dioctyl phthalate and added dropwise with stirring to 90 parts of Iriodin ® 123 Bright Lustre Satin.

III. Investigation of the Settling and Redispersing Behavior of Pigmented Paints and Printing Inks a) Mandrel test The pigmented printing inks or emulsion paints are poured into a 50 ml graduated cylinder. The sediment volume is determined for 30 days. Using a special measuring mandrel, the depth of penetration is determined on the 30the day relative to the entire sediment height. Sediment volume and penetration depth are a measure of the strength of the sediment and are inversely proportional to the latter.

b) spatula test

The redispersibility of the sediments in the pigmented printing inks and emulsion paints is determined by means of the spatula test. In dispersibility, the ratings are very good, good, medium, poor and very poor. The strength of the sediments is characterized by very hard, hard, medium, soft and very soft.

.1) Spatula test for redispersibility properties of a liquid ink rating: very good, good, medium, hard, very hard.

With a metal spatula of an area of 4 square centimeters the sediment is redispersed homogeneously. The force and the time necessary for this procedure are rated by a testing person.

2) Spatula test for hardness of sediment rating: very hard, hard, medium, soft, very soft. A metal spatula of 4 square centimeters is pushed into the sediment and is moved sideward. The force necessary for this procedure is rated by a testing person.

The coated pigment preparations are incorporated in a large number of blending systems of known printing ink manufacturers and in several emulsion paints, with which the preparations are compatible without exception.

The pigment concentration is 30% by weight in printing inks and 20% by weight in emulsion paints, respectively, in each case before dilution (17 sec DIN 4 cup in the case of printing inks and 35 sec DIN 4 cup in the case of emulsion paints).

| Experiment | Pigment | Diluent | Blend | Sediment height Sediment volume ml 1 h | Sediment height Sediment volume ml 32 days | Sediment height Sediment volume mm 32 days | Strength (mandrel) Penetration depth (mm) after 32 days | Spatula test after 22 days Sediment | Spatula test after 22 days Dispensibility |
|---|---|---|---|---|---|---|---|---|---|
| Blank without modifying reagent | Iriodin 300 (30%) | 1-methoxy-2-propanol | Aarberg Intaglio ink | 48.9 | 13.6 | 36.5 | 28.5 | solid | difficult |
| Pigment preparation using polyacrylate | Iriodin 300 (30%) | 1-methoxy-2-propanol | Aarberg Intaglio ink | 48.5 | 19.3 | 52.0 | ∞ | soft | good |
| Blank without modifying reagent | Iriodin 300 (30%) | 1-methoxy-2-propanol | Siegwerke Special intaglio ink | 49.0 | 19.9 | 56.0 | ∞ | soft | good |
| Pigment preparation using polyacrylate | Iriodin 300 (30%) | 1-methoxy-2-propanol | Siegwerke Special intaglio ink | 49.1 | 22.7 | 59.5 | ∞ | very soft | very good |
| Blank without modifying reagent | Iriodin 100 (20%) | Water | Siegwerke Emulsion paint | 50.0 | 18.3 | 49.0 | ∞ | soft | good |
| Pigment preparation using sodium polyacrylate | Iriodin 100 (20%) | Water | Siegwerke Emulsion paint | 50.0 | 24.8 | 65.0 | ∞ | very soft | very good |
| Blank without modifying reagent | Iriodin 123 (20%) | Water | Siegwerke Emulsion paint | 50.0 | 19.2 | 51.0 | ∞ | soft | medium |
| Pigment preparation using sodium polyacrylate | Iriodin 123 (20%) | Water | Siegwerke Emulsion paint | 49.9 | 24.2 | 64.1 | ∞ | very soft | very good |
| Blank without modifying reagent | Iriodin 123 (30%) | Ethanol | Hoechst AG Synthacryl | 48.4 | 16.2 | 42.2 | ∞ | solid | poor |
| Pigment preparation using sodium polyacrylate | Iriodin 123 (30%) | Ethanol | Hoechst AG Synthacryl | 48.4 | 30.9 | 82.2 | ∞ | very soft | very good |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A surface-modified, platelet-shaped pigment, coated with a modifying reagent comprising a polyacrylate, a polymethacrylate or a water-soluble salt thereof, with a high degree of dispersibility thereof in a paint or printing ink.

2. A process for the preparation of a surface-modified, platelet-shaped pigment according to claim 1, comprising adding a modifying reagent which is a polyacrylate or polymethacrylate or a water-soluble salt thereof to a platelet-shaped pigment.

3. A surface-modified, platelet-shaped pigment according to claim 1, wherein the modifying reagent further comprises a solvent or solvent mixture.

4. A surface modified platelet-shaped pigment according to claim 3, wherein the solvent is an aromatic solvent, an alcohol, an ester, an alkyl acetate, water or a mixture thereof.

5. A surface-modified, platelet-shaped pigment according to claim 1, wherein the modifying reagent further comprises a plasticizer.

6. A surface-modified, platelet-shaped pigment according to claim 1, wherein the polyacrylate, polymethacrylate or water-soluble salt thereof has a molecular weight of about 100 and 100,000.

7. A paint, varnish, printing ink and cosmetic composition containing a pigment and a carrier, wherein the pigment is one of claim 1.

8. A formulation comprising pigments according to claim 1 and a cosmetically acceptable carrier.

9. A surface modified platelet-shaped pigment according to claim 6, wherein the polyacrylate, polymethacrylate or water-soluble salt thereof has a molecular weight of about 800 to 20,000.

10. A surface modified platelet-shaped pigment according to claim 1, wherein the polyacrylate or polymethacrylate or water-soluble salts thereof is present in an amount of about 0.2 to 10%.

11. A surface modified platelet-shaped pigment according to claim 1, wherein the platelet-shaped pigment is mica, talc, kaolin, platelet-shaped iron oxide or bismuth oxychloride.

12. A surface modified platelet-shaped pigment according to claim 5, wherein the plasticizer is a phthalic ester with a linear, branched or cyclic alcohol having 1-12 carbon atoms, a fatty ester, a citric ester, an epoxidated fatty acid or a plasticizer based on phosphoric acid.

13. A process according to claim 2, further comprising the addition of solvent or solvent mixture 14. A process according to claim 2, further comprising the addition of a plasticizer.

* * * * *